US012675468B1

(12) United States Patent
Saxena et al.

(10) Patent No.: US 12,675,468 B1
(45) Date of Patent: Jul. 7, 2026

(54) OPTIMIZING SELECTION OF MATERIALIZED VIEWS FOR AUTOMATIC CREATION OR REFRESH

(71) Applicant: Amazon Technologies, Inc., Seattle, WA (US)

(72) Inventors: Gaurav Saxena, Cupertino, CA (US); Andre Hernich, Berlin (DE); Mario Guerriero, Berlin (DE); Panagiotis Parchas, Berlin (DE); Yannis Papakonstantinou, San Diego, CA (US); Vuk Ercegovac, Campbell, CA (US); Murali Narayanaswamy, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 2 days.

(21) Appl. No.: 17/724,300

(22) Filed: Apr. 19, 2022

(51) Int. Cl.
*G06F 16/23* (2019.01)
*G06F 16/215* (2019.01)
*G06F 16/2453* (2019.01)

(52) U.S. Cl.
CPC ........ *G06F 16/2393* (2019.01); *G06F 16/215* (2019.01); *G06F 16/24539* (2019.01)

(58) Field of Classification Search
CPC .............. G06F 16/2393; G06F 16/215; G06F 16/24539
See application file for complete search history.

(56) References Cited

U.S. PATENT DOCUMENTS

| | | | | |
|---|---|---|---|---|
| 5,535,385 A | | 7/1996 | Griffin et al. | |
| 6,205,451 B1 | | 3/2001 | Norcott et al. | |
| 6,334,128 B1 | * | 12/2001 | Norcott .............. | G06F 16/2393 |
| | | | | 707/999.005 |
| 6,356,891 B1 | * | 3/2002 | Agrawal ............ | G06F 16/2272 |
| | | | | 707/999.005 |
| 6,882,993 B1 | | 4/2005 | Lawande et al. | |
| 6,889,231 B1 | | 5/2005 | Souder et al. | |

(Continued)

FOREIGN PATENT DOCUMENTS

WO WO-2004072810 A2 * 8/2004 ......... G06F 16/2393

OTHER PUBLICATIONS

Han et al., An Autonomous Materialized View Management System with Deep Reinforcement Learning, 2021 IEEE 37th International Conference on Data Engineering (ICDE), pp. 2139-2164. (Year: 2021).*

(Continued)

*Primary Examiner* — Cheyne D Ly
(74) *Attorney, Agent, or Firm* — S. Scott Foster; Kowert, Hood, Munyon, Rankin & Goetzel, P.C.

(57) ABSTRACT
Materialized views may be optimally selected for materialized view creation or refresh. Materialized views for creation or refresh may be identified. A subset of the materialized may be determined according to an optimization technique that selects the subset of the materialized views according to a maximized performance benefit for maintaining the subset of materialized views based on a workload of the database system caused by a set of previously received queries. Individual ones of the subset of materialized views to create or refresh may be selected and performed according to a performance benefit-based order of the subset of the materialized views.

20 Claims, 10 Drawing Sheets

(56) References Cited

U.S. PATENT DOCUMENTS

| | | | |
|---|---|---|---|
| 7,191,169 | B1 * | 3/2007 | Tao ................... G06F 16/24539 |
| | | | 707/999.102 |
| 11,113,273 | B2 | 9/2021 | Deshpande et al. |
| 11,308,079 | B2 | 4/2022 | Deshpande et al. |
| 2003/0088541 | A1 | 5/2003 | Zilio et al. |
| 2005/0114307 | A1 | 5/2005 | Li et al. |
| 2005/0235004 | A1 | 10/2005 | Folkert et al. |
| 2006/0184338 | A1 * | 8/2006 | Lightstone .......... G06F 11/3447 |
| | | | 702/182 |
| 2009/0177697 | A1 * | 7/2009 | Gao ................... G06F 16/2471 |
| 2012/0047117 | A1 * | 2/2012 | Nica ................... G06F 16/2393 |
| | | | 707/797 |
| 2012/0209807 | A1 | 8/2012 | Li |
| 2014/0280028 | A1 | 9/2014 | Ding et al. |
| 2015/0356494 | A1 | 12/2015 | Kolesnikov |
| 2017/0092060 | A1 | 3/2017 | Toohey et al. |
| 2017/0249354 | A1 * | 8/2017 | Lee ..................... G06F 16/2358 |
| 2018/0081905 | A1 | 3/2018 | Kamath et al. |
| 2018/0139271 | A1 | 5/2018 | Kumar et al. |
| 2019/0332698 | A1 | 10/2019 | Cho et al. |
| 2020/0110748 | A1 | 4/2020 | Watzke et al. |
| 2020/0311043 | A1 | 10/2020 | Pham et al. |
| 2020/0334254 | A1 | 10/2020 | Arye et al. |
| 2020/0379993 | A1 | 12/2020 | Rajaperumal et al. |
| 2021/0165782 | A1 | 6/2021 | Deshpande et al. |
| 2021/0165783 | A1 * | 6/2021 | Deshpande ....... G06F 16/24568 |
| 2021/0165789 | A1 | 6/2021 | Deshpande et al. |
| 2021/0165803 | A1 | 6/2021 | Deshpande et al. |
| 2022/0083542 | A1 | 3/2022 | Thiyagarajan et al. |
| 2022/0083547 | A1 | 3/2022 | Thiyagarajan et al. |
| 2022/0083548 | A1 * | 3/2022 | Thiyagarajan .... G06F 18/24765 |

OTHER PUBLICATIONS

Hanso, E. N., A Performance Analysis of View Materialization Strategies, ACM SIGMOD Record, vol. 16, Issue 3 pp. 440-453, 1987. (Year: 1987).*

U.S. Appl. No. 17/118,408, filed Dec. 10, 2020, Yannis Papakonstantinou, et al.

Johnson, Theodore, et al., "Update Propagation in a Streaming Warehouse," In International Conference on Scientific and Statistical Database Management 2011, Lecture Notes in Computer Science, vol. 6809, Jul. 20, 2011, pp. 129-149, Springer, Berlin, Heidelberg.

* cited by examiner

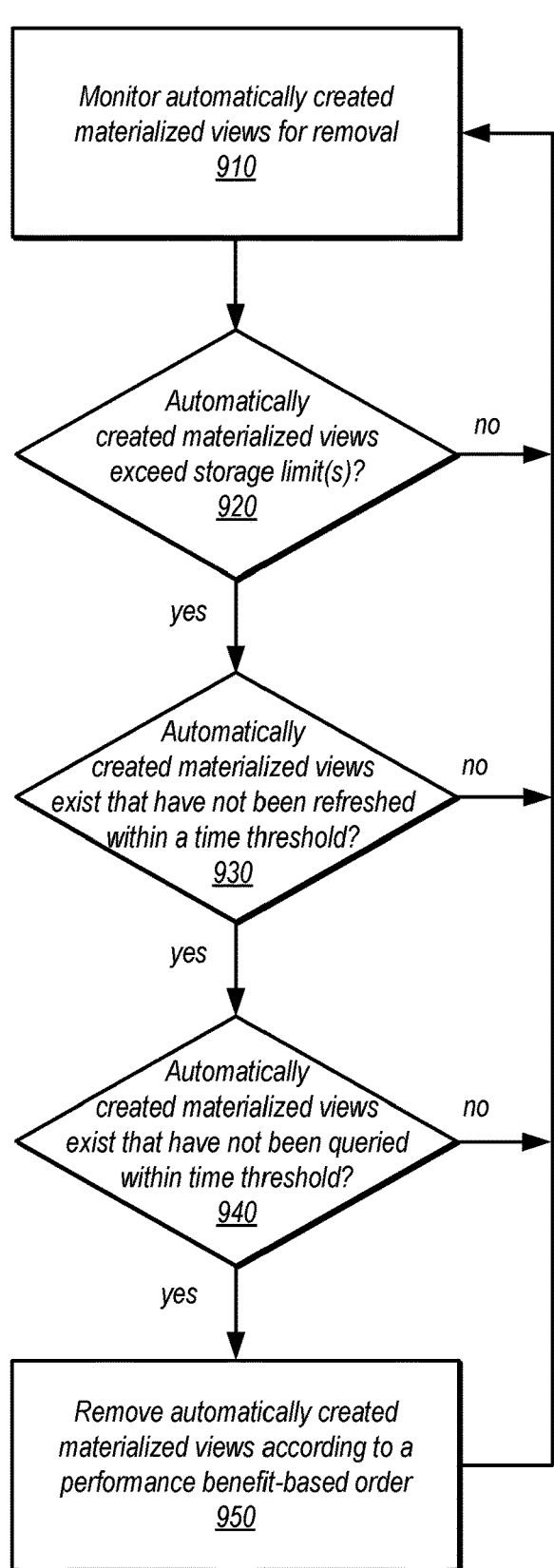

*Monitor automatically created materialized views for removal*
*910*

*Automatically created materialized views exceed storage limit(s)?*
*920* no yes

*Automatically created materialized views exist that have not been refreshed within a time threshold?*
*930* no yes

*Automatically created materialized views exist that have not been queried within time threshold?*
*940* no yes

*Remove automatically created materialized views according to a performance benefit-based order*
*950*

*FIG. 9*

OPTIMIZING SELECTION OF MATERIALIZED VIEWS FOR AUTOMATIC CREATION OR REFRESH

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data processing.

For example, data processing is often measured by the speed at which requests to access data are performed. Many types of data access requests require intensive computational and storage access workloads. As data stores may have to process high workload access requests, techniques that reduce computational load, such as techniques that provide materialized views, may be implemented.

BRIEF DESCRIPTION OF THE DRAWINGS

FIG. 9 is a high-level flowchart illustrating methods and techniques to implement removing automatically created materialized views, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for optimizing selection of materialized views for creation or refresh are described herein. Materialized views may be created for databases to offer a performance benefit to client applications because the results of a query stored as a materialized view may not have to be performed again in order to obtain information already found in the materialized view, in various embodiments. For example, instead of submitting the same query to database, the query may be submitted once to create the materialized view to obtain information. Then, when the information is desired again, a query may be directed to the materialized view which already stores the information, saving computing resources to find, evaluate, combine, and/or otherwise process database data into a result for the query (or a query that is based on or could use the result of the query that is used to create the materialized view).

Figure 1:
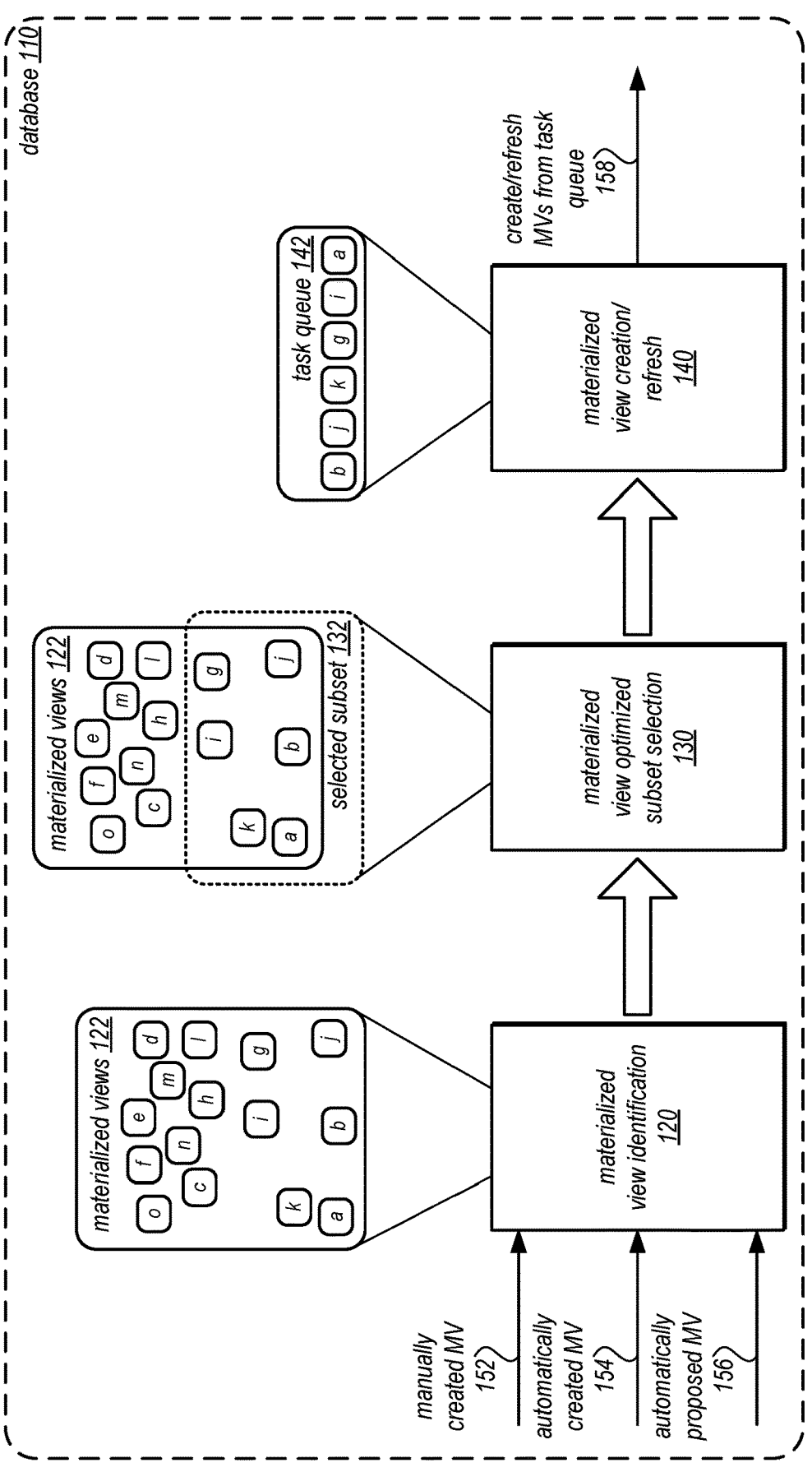
FIG. 1 is a logical block diagram illustrating optimizing selection of materialized views for creation or refresh, according to some embodiments

FIG. 1 is a logical block diagram illustrating optimizing selection of materialized views for creation or refresh, according to some embodiments. Database 110 may be a database or other data store that provides management, maintenance, and/or access to data or information. For example, database 110 may be a relational database that provides online transactional processing (OLTP), such as may be found in databases supporting transaction heavy workloads, or online analytical processing (OLAP), such as may be data warehouse style databases that support heavy analytical workloads.

The data or information for database may be organized into collections, groups, or sets of related information, such as tables. For example, table(s) may be organized according to a table schema that specifies the number and data types (e.g., character, string, integer, floating point, etc.), column names, and/or other table information. Entries of table(s) may be individual items or rows that include values for different columns (including null values in some embodiments). Client applications of database 110 may submit queries or other requests to retrieve, manipulate, process and/or otherwise return information from table(s).

Database 110 may implement materialized view identification 120. Materialized views may be identified in various ways, such as manually, as indicated at 152, or automatically, as indicated at 154 and 156. As discussed in detail below, automatically created materialized views may identified according to query history information and used to improve query performance. These materialized views 122 that are identified may then be used to perform materialized view optimized subset selection 130. For example, selected subset 132 may include materialized views with a performance benefit value (e.g., determined according to a performance benefit function) which may then be optimized according to an optimization technique, such as a Cross Entropy technique discussed below with regard to FIG. 7. The subset may then be ordered in a task queue 142, according to which materialized view creation/refresh 140 may pull materialized views for creation and refresh operations 158.

Please note that the previous description of a database, table, materialized view, query plan, and various interactions are logical descriptions and thus is not to be construed as limiting as to the implementation of these features.

This specification continues with a general description of a provider network that implements database services (or other data storage or processing services) that may implement using computer resources to perform database queries and implement materialized views, including rewriting queries to compensate for stale materialized views. Then various examples of one such database service, including different components/modules, or arrangements of components/module that may be employed as part of implementing the techniques are discussed. A number of different methods and techniques to implement rewriting queries to compensate for stale materialized views, some of which are illustrated in accompanying flowcharts, are then discussed. Finally, a description of an example computing system upon which the various components, modules, systems, devices, and/or nodes may be implemented is provided. Various examples are provided throughout the specification.

Figure 2:
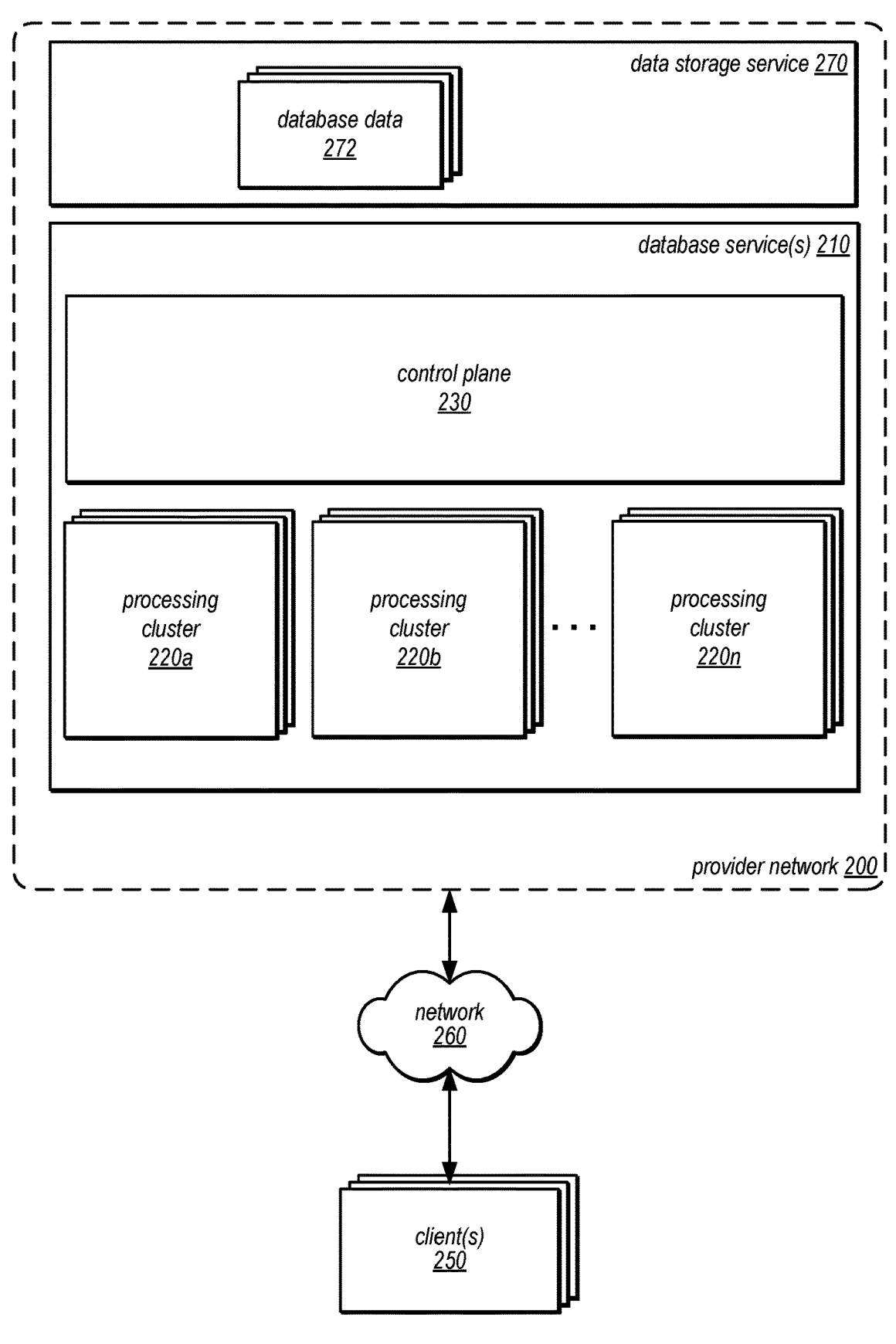
FIG. 2 is a logical block diagram illustrating a provider network offering a database service that provides materialized views for databases hosted in the database service, according to some embodiments.

FIG. 2 is a logical block diagram illustrating a provider network offering a database service that provides materialized views for databases hosted in the database service, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 2000 described below with regard to FIG. 10), needed to implement and distribute the infrastructure and services offered by the provider network 200, in one embodiment. In some embodiments, provider network 200 may implement various computing resources or services, such as database service(s) 210 or other data processing services, (e.g., a map reduce service, a data warehouse service, and other large scale data processing services) and/or any other type of network based services (which may include a virtual compute service and various other types of storage, processing, analysis, communication, event handling, visualization, data cataloging, data ingestion (e.g., ETL), and security services not illustrated), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below, in one embodiment. In various embodiments, the functionality of a given system or service component (e.g., a component of database service(s) 210 may be implemented by a particular node or may be distributed across several nodes. In some embodiments, a given node may implement the functionality of more than one service system component (e.g., more than one data store component).

Database services 210 may be various types of data processing services that perform general or specialized data processing functions (e.g., analytics, big data querying, or any other type of data processing operation) over data that is stored across multiple storage locations, in some embodiments. For example, in at least some embodiments, database services 210 may include various types of database services (e.g., relational) for storing, querying, and updating data. Such services may be enterprise-class database systems that are scalable and extensible. Queries may be directed to a database in database service(s) 210 that is distributed across multiple physical resources, as discussed below, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system or via Application Programming Interfaces (APIs). In other embodiments, external applications and programs may submit queries using Open Database Connectivity (ODBC) and/or Java Database Connectivity (JDBC) driver interfaces to the database system.

In some embodiments, database service(s) 210 may include services that process requests to data that is not stored in fully structured storage (e.g., non-relational or NoSQL databases). Database services 210 may access the data that is semi-structured or not-structured in storage, such as data objects of unstructured or semi-structured data in a separate data storage service, in one embodiment. In other embodiments, database services 210 may locally store, managed, and access semi-structured or not-structured data (e.g., an object-based and/or key-value data store that stores tables joined with tables in other services, such as database service(s) 210 or the same storage service).

Generally speaking, clients 250 may encompass any type of client that can submit network-based requests to provider network 200 via network 260, including requests for database service(s) (e.g., a request or other query to a database in database services 210, etc.). For example, a given client 250 may include a suitable version of a web browser, or may include a plug-in module or other type of code module that can execute as an extension to or within an execution environment provided by a web browser. Alternatively, a client 250 may encompass an application, such as a database application (or user interface thereof), a media application, an office application or any other application that may make use of database services 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200.

In some embodiments, client 250 may generate network-based services requests according to a Representational State Transfer (REST)-style network-based services architecture, a document- or message-based network-based services architecture, or another suitable network-based services architecture. In some embodiments, clients of database service(s) 210 may be internal to or implemented as part of provider network 200 (e.g., on another provider network service not illustrated).

In some embodiments, a client 250 may provide access to provider network 200 to other applications in a manner that is transparent to those applications. For example, client 250 may integrate with an operating system or file system to provide storage on one of database service(s) 210 (e.g., a database table that stores data on behalf of the operating system or file system). However, the operating system or file system may present a different storage interface to applications, such as a conventional file system hierarchy of files, directories and/or folders. In such an embodiment, applications may not need to be modified to make use of the storage system service model. Instead, the details of interfacing to database service(s) 210 may be coordinated by client 250 and the operating system or file system on behalf of applications executing within the operating system environment. Similarly, a client 250 may be an analytics application that relies upon database services to execute various queries for data already ingested or stored in the database service 210 or data stored in a data lake hosted in other storage service(s) in provider network 200 that may be accessible to a query engine implemented as part of database service(s) 210).

Clients 250 may convey network-based services requests (e.g., access requests to read or write data) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In at least some embodiments, a database service 210 may be a data warehouse service or other database that stores data across multiple storage locations (e.g., across different nodes in a processing cluster). In such scenarios a data warehouse service, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data, in one embodiment. A client's use for the data may also affect the configuration of the data management system used to store the data. For instance, for certain types of data analysis and other operations, such as those that aggregate large sets of data from small numbers of columns within each row, a columnar database table may provide more efficient performance, in one embodiment. In other words, column information from database tables may be stored into data blocks on disk, rather than storing entire rows of columns in each data block (as in traditional database schemes). The following discussion describes various embodiments of a column-oriented (sometimes referred to as "columnar") database service (e.g., such as data warehouse service). However, various versions of the components discussed below as may be equally adapted to implement embodiments for various other types of systems, such as row-oriented database systems. Therefore, the following examples are not intended to be limiting as to various other types or formats of structured data that may be stored, accessed, or otherwise managed by database service 210.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Database service 210 may be implemented by a large collection of computing devices, such as customized or off-the-shelf computing systems, servers, or any other combination of computing systems or devices, such as the various types of systems 2000 described below with regard to FIG. 10, in some embodiments. Different subsets of these computing devices may be controlled by control plane 230. Control plane 230, for example, may provide an interface to clients or users who wish to interact with the processing clusters 220 managed by control plane 230. For example, the interface may implement one or more Application Programming Interfaces (APIs) to allow client systems to programmatically invoke database service operations, functions, or other features and/or the interface may implement or provide one or more graphical user interfaces (GUIs) for storage clients (e.g., as a web-console). The interface may allow clients to select various control functions offered by database service 210 for the processing clusters 220 hosted in the database service 210, in some embodiments. For example, a user may make adjustments to workload allocations, prioritization schemes, cluster size, network mappings or other operations or tasks for performing a query.

In at least some embodiments, control plane 230 may implement cluster performance monitoring, which may track, store, organize and/or evaluate performance metrics collected for queries performed at processing clusters 220. For example, performance monitoring may receive reported metrics from a leader node, and store them in a common storage location (e.g., in a file, direct, or object within a storage service) for the database (or user account associated with the database). In some embodiments, performance monitoring may evaluate processing cluster performance in order to trigger the performance of various control plane 230 operations (e.g., node replacement or failover operations). In some embodiments, cluster scaling may be implemented as part of control plane 230 to respond to user requests to add or remove node from a processing cluster or automatically triggered requests/events to add or remove nodes (e.g., based on utilization thresholds for processing, storage, network, or other cluster resource).

Various clients (or customers, organizations, entities, or users) may wish to store and manage data using database service 210, in some embodiments. Processing clusters, such as processing clusters 220a, 220b, and 220n may respond to various requests, including write/update/store/redistribute requests (e.g., to add data into storage) or other queries for data (e.g., such as a Server Query Language request (SQL) for particular data), as discussed below with regard to FIG. 3, along with many other data management or storage services, in some embodiments. Queries may be directed to data that is locally hosted as part of database service 210 or stored elsewhere that is fully structured data or queries directed to data that is not-structured, such as log records, event data, or machine generated data stored in another storage service, in some embodiments.

Multiple users or clients may access a processing cluster 220 to obtain data warehouse services, in one embodiment. In at least some embodiments, a database service 210 may provide network endpoints to the clusters which allow the clients to send requests and other messages directly to a particular cluster. Network endpoints, for example, may be a particular network address, such as a URL, which points to a particular cluster, in one embodiment. For instance, a client may be given the network endpoint "http://myclus-ter.com" to send various request messages to. Multiple clients (or users of a particular client) may be given a network endpoint for a particular cluster, in one embodiment. Various security features may be implemented to prevent unauthorized users from accessing the clusters, in some embodiments. Conversely, a client may be given network endpoints for multiple clusters, in one embodiment.

Processing clusters 220 may provide an enterprise-class database query and management system that allows users to send data processing requests to be executed by the clusters 220, such as by sending a data processing request to a cluster control interface implemented by the processing clusters, in some embodiments. Processing clusters 220 may perform data processing operations with respect to data stored locally in a processing cluster. Requests sent to a processing cluster 220 may be directed to local data stored in the processing cluster, in some embodiments. Therefore, processing clusters may implement local data processing to plan and execute the performance of requests or other queries with respect to local data in the processing cluster in one embodiment. In some embodiments, the processing clusters may access or send processing instructions to data that is stored remote from and/or external to the processing clusters, such as data stored in another service.

Processing clusters 220 may allow users of database service 210 to perform data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, subqueries, and aggregation, more efficiently, in various embodiments. In other embodiments, database service 210 and/or processing clusters 220 may offer query capabilities may query over other types of data (e.g., semi-structured data, unstructured data, various other kinds of data, such as media, or no-schema data).

Figure 3:
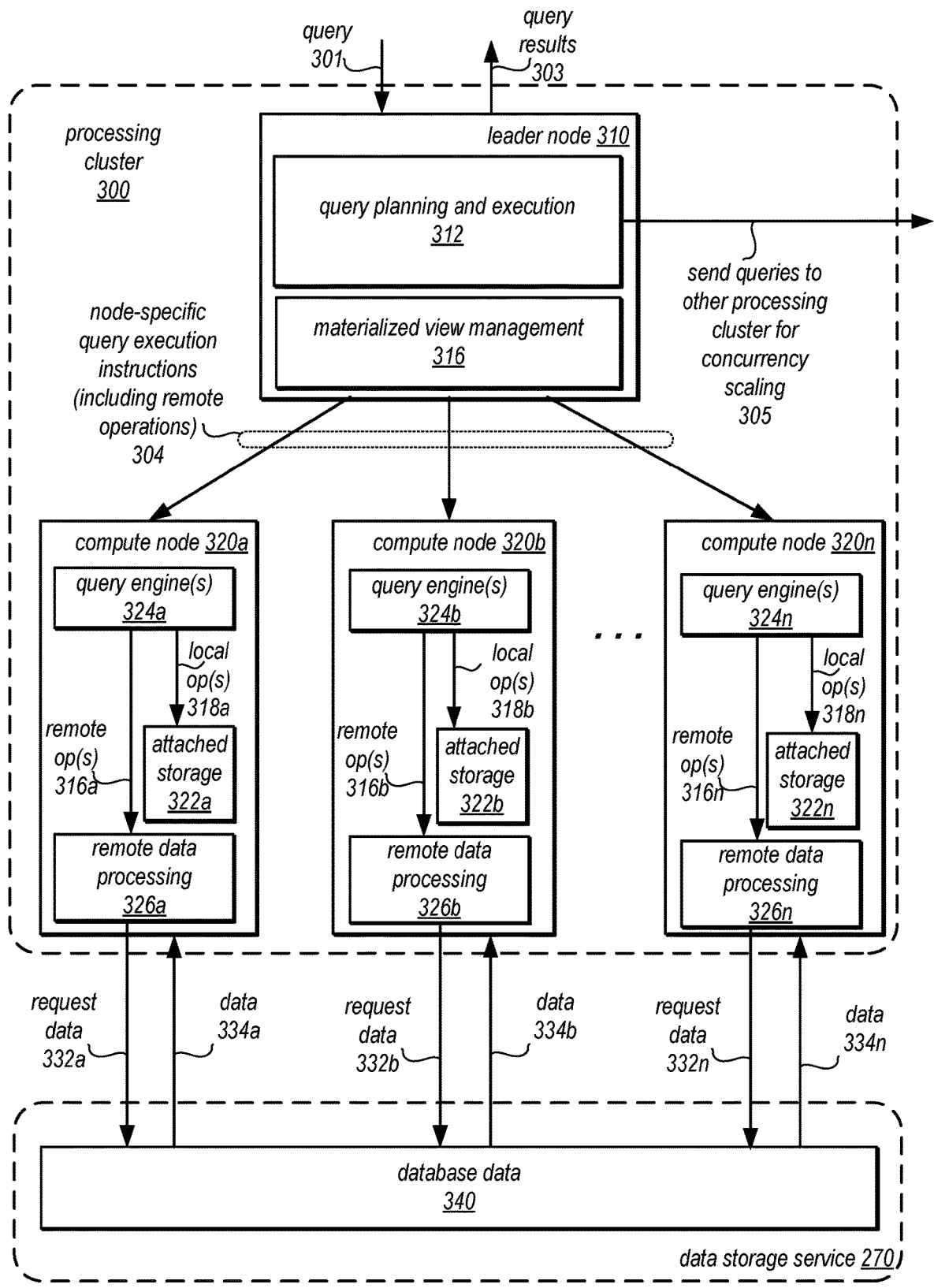
FIG. 3 is a logical block diagram illustrating a processing cluster of a database service that implements materialized view management to provide access to materialized views, according to some embodiments.

FIG. 3 is a logical block diagram illustrating a processing cluster of a database service that implements materialized view management to provide access to materialized views, according to some embodiments. Processing cluster 300 may be data warehouse service cluster, like processing clusters 220 discussed above with regard to FIG. 2, or another processing cluster that distributes execution of a query among multiple processing nodes, in one embodiment. As illustrated in this example, a processing cluster 300 may include a leader node 310 and compute nodes 320a, 320b, and 320n, which may communicate with each other over a network or other interconnect (not illustrated), in one embodiment. Leader node 310 may implement request planning 312 to generate plan(s) and instructions 314 for executing various requests 302, such as query, or requests to update, add, modify, or remove data, on processing cluster 300, in one embodiment.

Leader node 310 may implement materialized view management 316, discussed in detail below with regard to FIG. 4, to create and update materialized views. Leader node 310 may also implement metric planning history/performance metric collection (not illustrated) to collect and report performance metrics collected for various events, units of work, or other portions a query or other operation's performance, compute node or leader node performance, and history of operations performed, in some embodiments. As described herein, each node in a processing cluster 300 may include attached storage, such as storage device(s) 324a, 324b, and 324n, on which a database, including tables and materialized views (or portions thereof) may be stored on behalf of clients (e.g., users, client applications, and/or storage service subscribers), in one embodiment.

Note that in at least some embodiments, data processing capability may be separated from compute nodes, and thus in some embodiments, additional components may be implemented for processing requests. Additionally, it may be that in some embodiments, no one node in processing cluster 300 is a leader node as illustrated in FIG. 3, but rather different nodes of the nodes in processing cluster 300 may act as a leader node or otherwise direct processing of requests to data stored in processing cluster 300, in one embodiment. While nodes of processing cluster may be implemented on separate systems or devices, in at least some embodiments, some or all of processing cluster may be implemented as separate virtual nodes or instance on the same underlying hardware system (e.g., on a same server).

Leader node 310 may manage communications with clients, such as clients 250 discussed above with regard to FIG. 2, in one embodiment. For example, leader node 310 may be a server that receives an access request (e.g., a query for data or a request to add data) 302 from various client programs (e.g., applications) and/or subscribers (users), then parses them and develops an execution plan (e.g., query plan(s)) to carry out the associated database operation(s).

Leader node 310 may develop the series of steps necessary to obtain results for query 302, in one embodiment. Query 302 may be a query directed to a database table that is stored within processing cluster 300 (e.g., at one or more of compute nodes 320), in one embodiment. Leader node 310 may also manage the communications among compute nodes 320 instructed to carry out database operations for data stored in the processing cluster 300, in one embodiment. For example, node-specific request instructions 314 may be generated or compiled code that is distributed by leader node 310 to various ones of the compute nodes 320 to carry out the steps needed to perform a query or other operation in request 302, including executing the code to generate intermediate results of request 302 at individual compute nodes that may be sent back to the leader node 310, in one embodiment. Leader node 310 may receive data and responses or results (e.g., data 344*a*, 344*b*, and 344*c*) from compute nodes 320 in order to determine a final result for a request, in one embodiment. A database schema, data format and/or other metadata information for the data stored among the compute nodes, such as the data tables stored in the cluster, may be managed and stored by leader node 310 or obtained from a separate store (e.g., a data catalog service), in some embodiments. Request planning 312 may include the generation and selection of a plan to perform requests 302, in some embodiments.

Processing cluster 300 may also include compute nodes, such as compute nodes 320*a*, 320*b*, and 320*n*. Compute nodes 320, may for example, be implemented on servers or other computing devices, such as those described below with regard to computer system 2000 in FIG. 10, and each may include individual query processing "slices" defined, for example, for each core of a server's multi-core processor, one or more data processing engine(s), such as data processing 322*a*, 322*b*, and 322*n*, to execute the instructions 314 or otherwise perform the portions of the request plan assigned to the compute node, in one embodiment. Data processing 322 may access a certain memory and disk space in order to process a portion of the workload for a request that is sent to one or more of the compute nodes 320. Data processing 322 may access attached storage, such as 322*a*, 322*b*, and 322*n*, to perform operation(s), in one embodiment. For example, data processing 322 may scan data in attached storage 324, access indexes, perform joins, semi joins, aggregations, or any other processing operation assigned to the compute node 320, in one embodiment. Compute nodes 320 may send intermediate or final results from requests back to leader node 310 for final result generation (e.g., combining, aggregating, modifying, joining, etc.). Data, such as a database table, may be partitioned or otherwise distributed across the storage device(s) 324 as different partitions or shards of the data, in some embodiments. Compute nodes 320 may receive instructions specific to the shard(s) or partition(s) of the data to which the compute node 320 has access. Compute nodes 320 may implement metrics collection agents (not illustrated) in order to obtain the various performance metrics that may be collected for performing performance analysis for query planning, optimization, and execution of subsequent database queries.

Storage device(s), such as storage devices 324*a*, 324*b*, and 324*n*, may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 4:
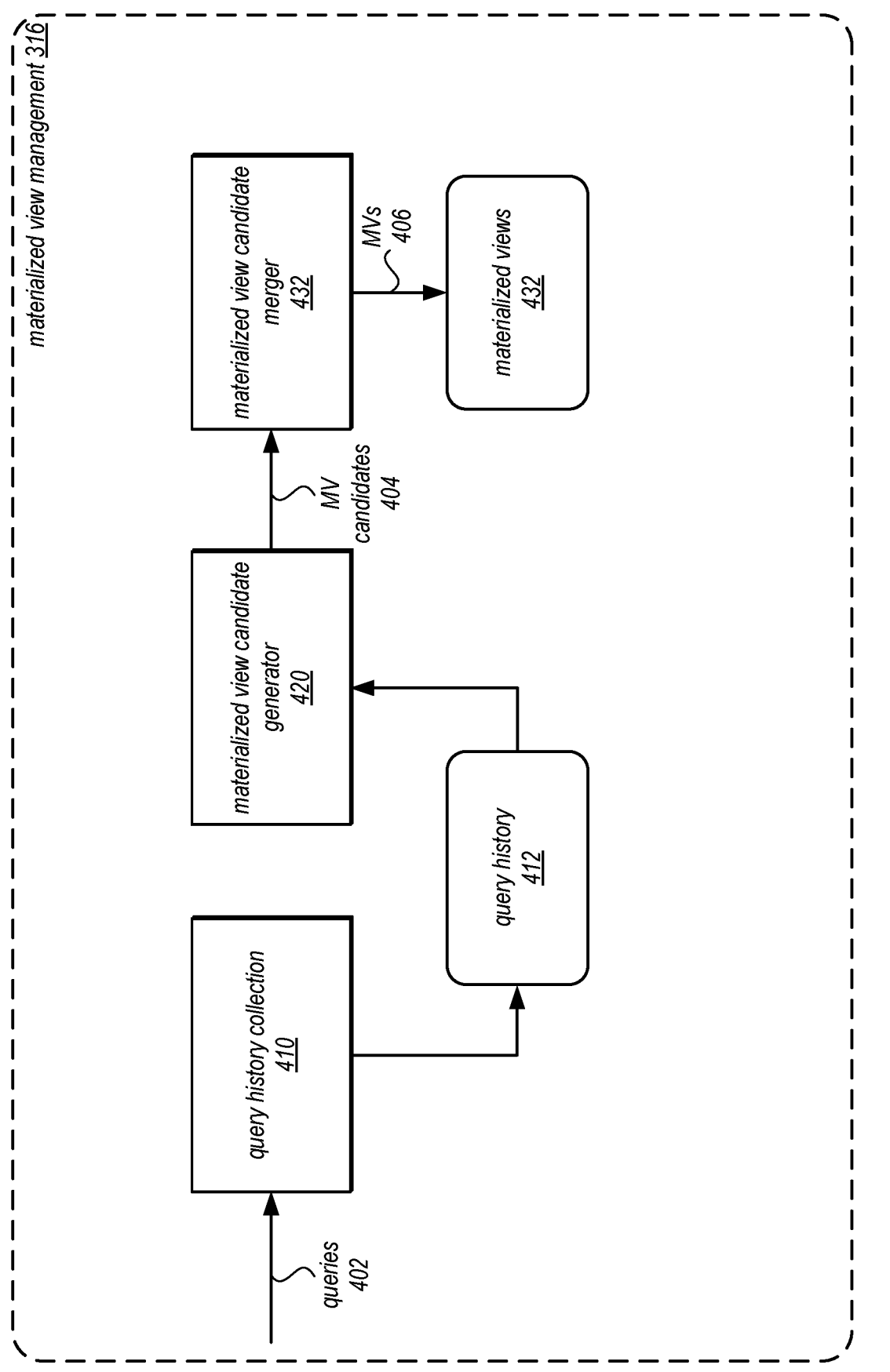
FIG. 4 is a logical block diagram illustrating materialized view management that implements proposing materialized view candidates, according to some embodiments.

FIG. 4 is a logical block diagram illustrating materialized view management that implements proposing materialized view candidates, according to some embodiments. Query history collection 410 may track performed queries 402. In some embodiments, query history collection 410 may filter out those queries that are less than a certain amount of execution time (e.g., short queries less than 2 seconds). In some embodiments, query execution history may be maintained as a time period (e.g., a window of time).

Figure 8:
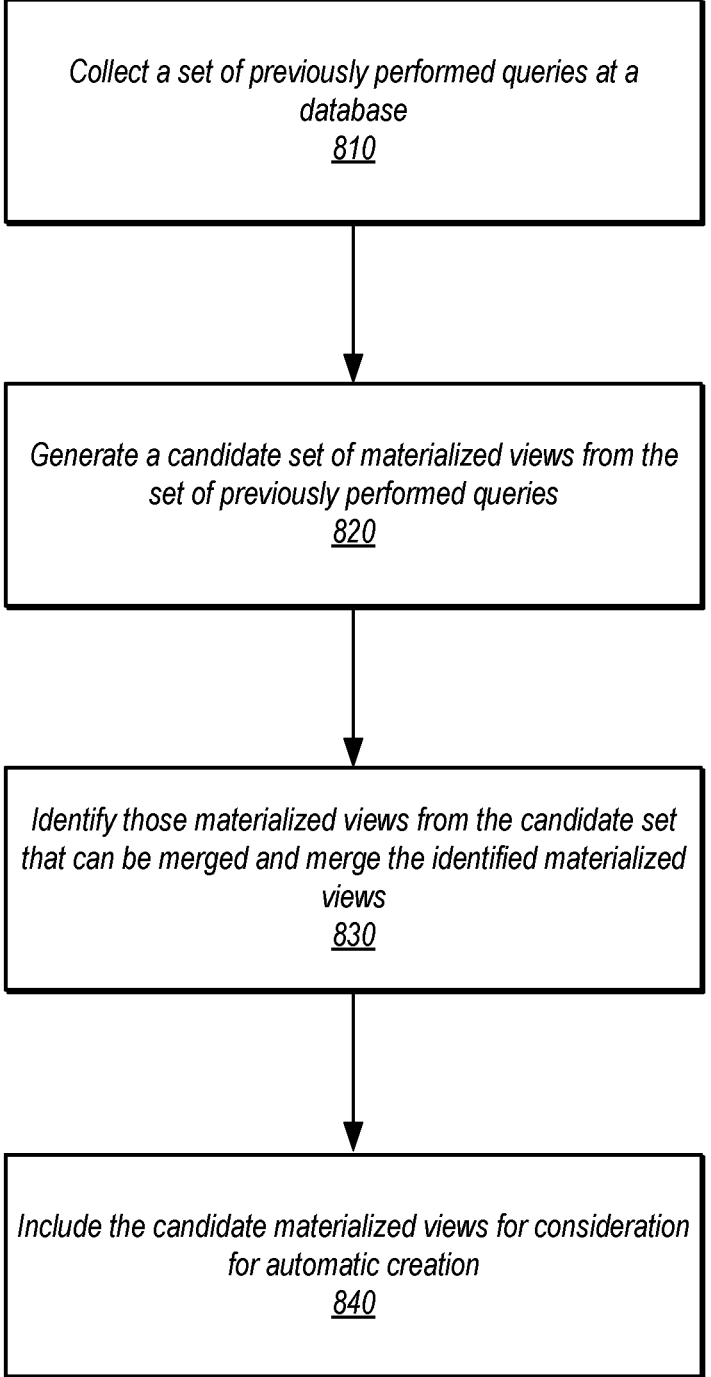
FIG. 8 is a high-level flowchart illustrating methods and techniques to implement proposed materialized views for creation, according to some embodiments.

The collected queries may be stored as part of query history 412 and used by materialized view candidate generator 420 which may implement the various techniques discussed below with regard to FIG. 8 to extract materialized view candidates from queries and provide, as indicated at 404, these materialized view candidates for possible merger, as indicated at 432. Those merged, as well as non-merged materialized views may then be added, as indicated at 406, to materialized views 432. Materialized views 432 may include both proposed and existing materialized views.

Figure 5:
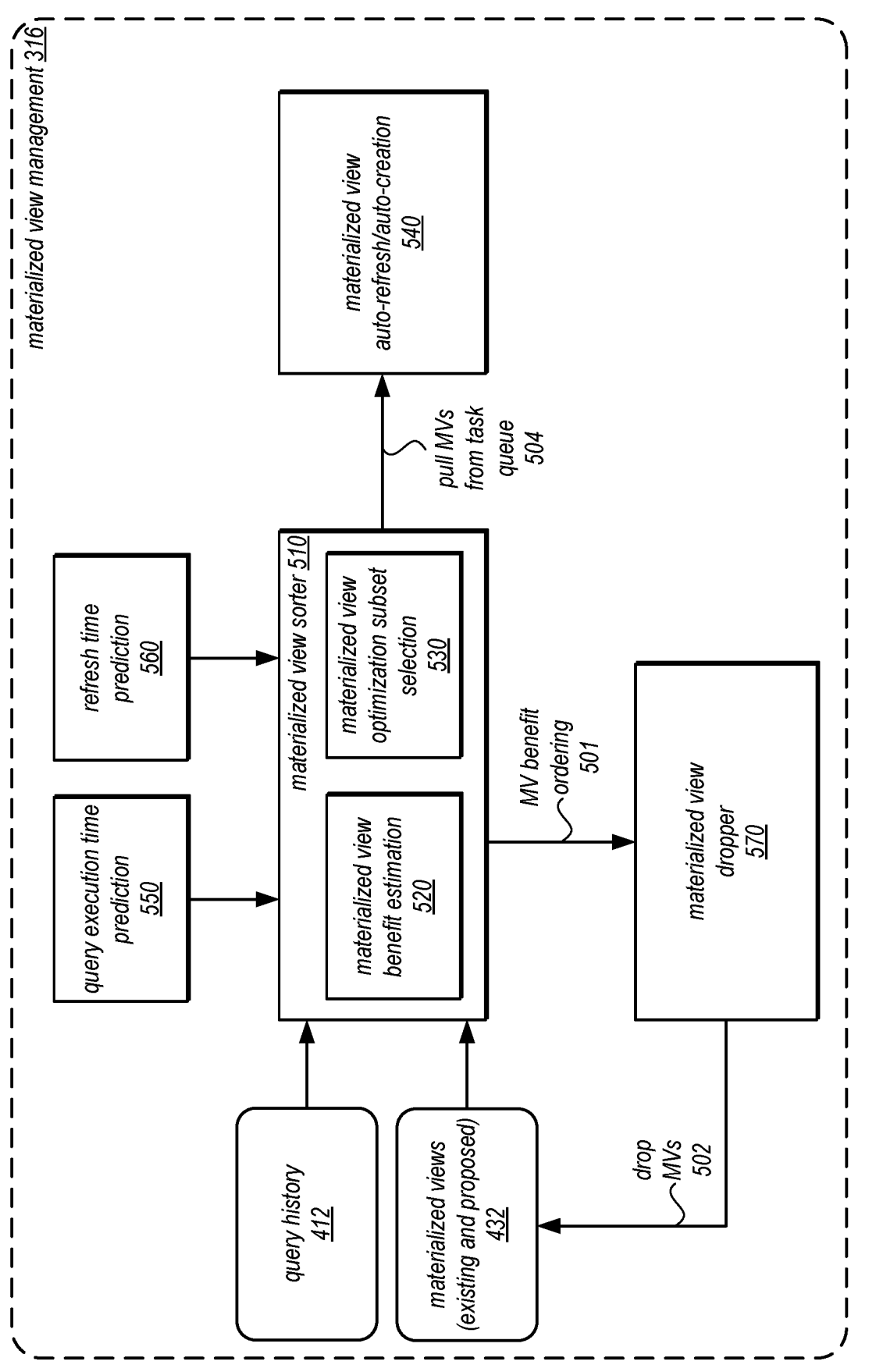
FIG. 5 is a logical block diagram illustrating materialized view management that implements a materialized view to determine which materialized views to create or refresh and the order in which to create or refresh the materialized views, according to some embodiments.

FIG. 5 is a logical block diagram illustrating materialized view management that implements a materialized view to determine which materialized views to create or refresh and the order in which to create or refresh the materialized views, according to some embodiments. Materialized view sorter 510 may determine materialized view benefit estimations 520 determined for each of the possible materialized views 432 given some query history 412. Materialized view benefit estimation 520 may implement various benefit functions. Below is an example of one such benefit function that may be implemented in some embodiments.

Consider that:

$$\text{Benefit per query=execution time of query w/o } AMVs(A)-$$

$$\text{execution time of query with } AMVs(B)$$

However only one of A/B may be available at any time. Therefore, we use estimate of execution time normalized by real execution time of one of the scenarios (A/B). We consider the ratio of estimated execution time to real execution time to be $\rho$. Depending on which values are available (A/B), the definition of $\rho$, respectively, is:

$$\rho=\text{real execution time of query without } AMV/\text{estimated execution time of query without } AMV$$

or $$\rho=\text{real execution time of query with } AMV/\text{estimated execution time of query with } AMV$$

where

Benefit to a query=$\rho$*(estimated execution time of
 query w/o *AMVs*−estimated execution time of query with *AMVs*)

A total benefit may be:

total benefit=(Sum of benefit to queries−Sum of
 *AMV* refresh cost).

Query execution time prediction 550 may be one of various types of machine learning models trained to provide an inference that indicates a predicted execution time for a query. Query execution time prediction 550 may both include automatically materialized views and not include automatically created materialized views. Refresh time prediction 560 may be one of various types of machine learning models trained to provide an inference that indicates a prediction of time to refresh an automatically created materialized view (e.g., based on the changes to base tables and the AST version of the materialized view definition).

Figure 7:
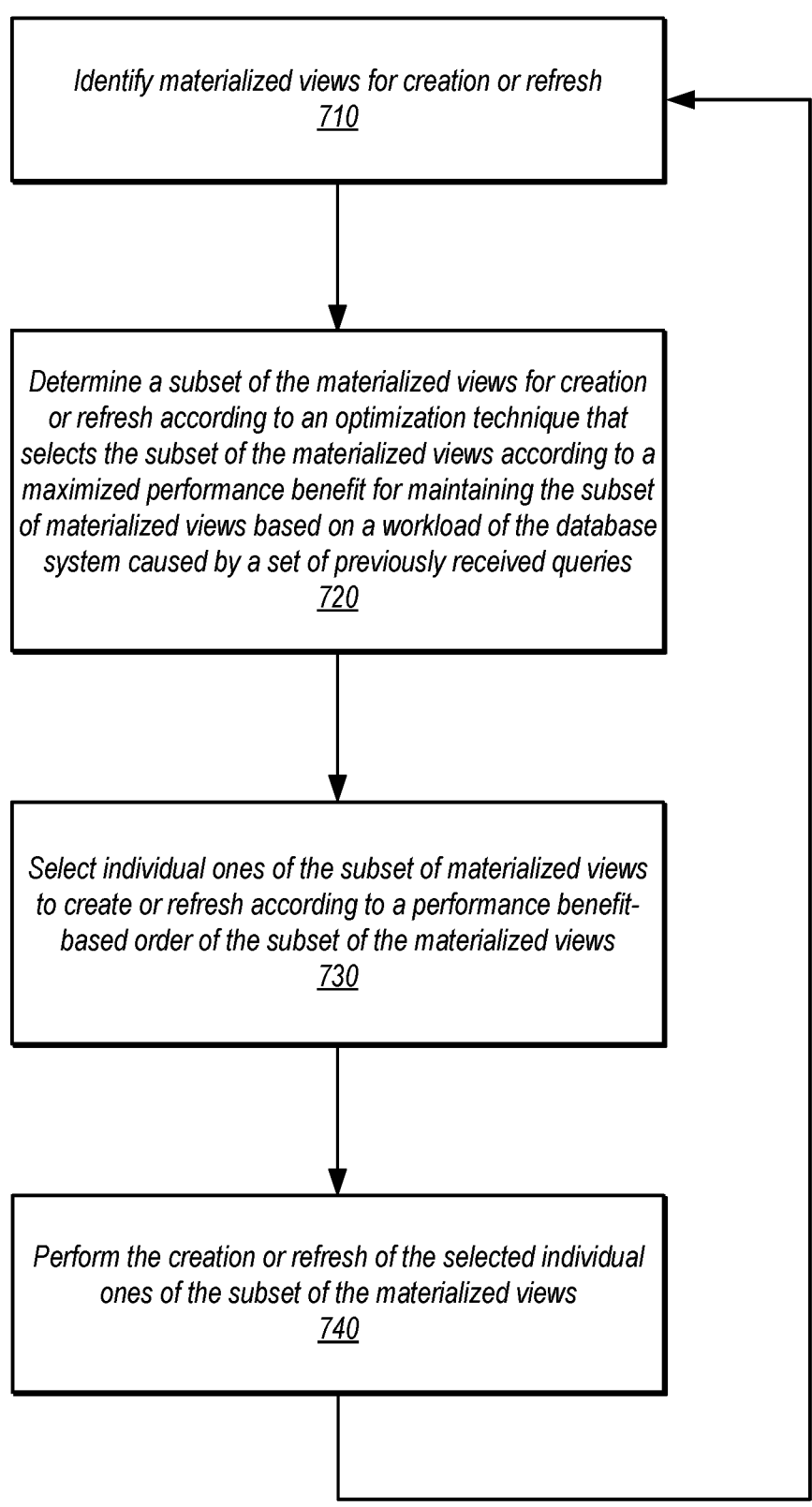
FIG. 7 is a high-level flowchart illustrating methods and techniques to implement optimizing selection of materialized views for creation or refresh, according to some embodiments.

Materialized view optimization subset selection 530 may apply an optimization technique, as discussed in detail below with regard to FIG. 7, to select a subset of materialized views to create or refresh that optimizes the performance benefit assuming a workload (e.g., based on query history 412). Performance benefit values for reach of the subset of materialized views may be used to queue the subset of materialized views in a task queue, from which materialized view auto-refresh/auto-creation 540 may pull, as indicated at 504. As discussed below, materialized view auto-refresh/auto-creation 540 may manage the capacity to create or refresh materialized views, which may be limited to a number of execution slots, threads, or workers. In some embodiments, these execution slots, threads, or workers may allow for parallel performance of operations to create or refresh the selected individual ones of the subset of the materialized views. In some embodiments where additional processing capacity is available, such as an additional processing cluster, instructions to send queries off to the additional processing cluster to increase the number of slots or other capacity at a current processing cluster or to send materialized view creation or refresh tasks to that additional processing cluster.

Materialized view dropper 570 may be implemented, in some embodiments, to drop materialized views, as indicated at 502. These materialized views may be dropped after various removal conditions are satisfied, such as those discussed below with regard to FIG. 9. In some embodiments, materialized views may be dropped in a performance benefit based order (e.g., lower benefit values first). For example, materialized view dropper 570 may receive materialized view benefit ordering information 502 from materialized view sorter 510.

Figure 6:
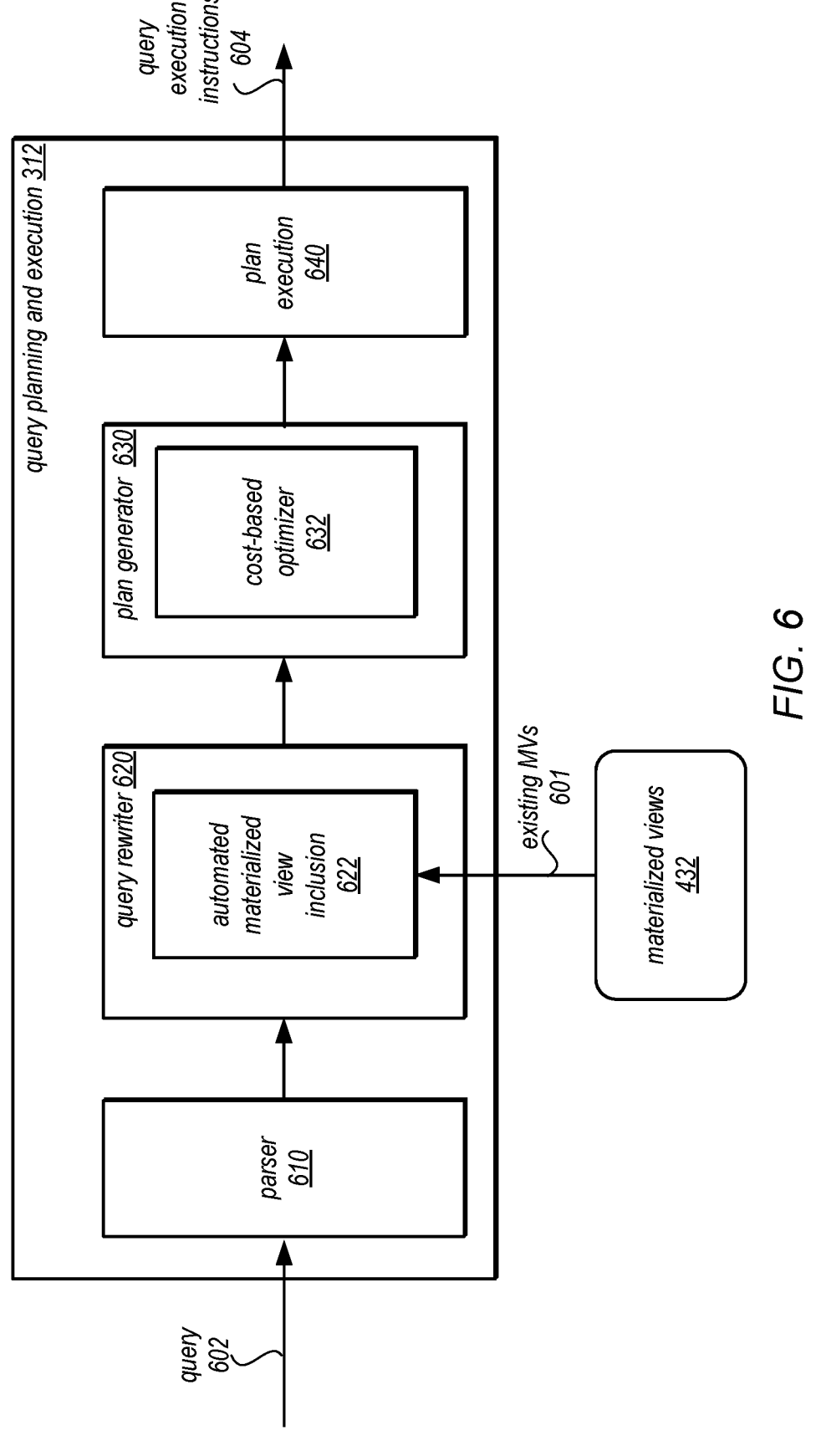
FIG. 6 is a logical block diagram illustrating query planning for a query engine implemented by a processing cluster that implements rewriting queries to use automatically created materialized views, according to some embodiments.

FIG. 6 is a logical block diagram illustrating query planning for a query engine implemented by a processing cluster that implements rewriting queries to use automatically created materialized views, according to some embodiments. Query planning and execution 312 may implement parser 610 to receive a query statement, such as a SQL statement, and determine the various requested operations to perform as a result of the query. For example, parser 610 may generate a query tree for a given query input string to separate out the various query clauses, fields, predicates, conditions, commands, or other query information for planning and optimization.

Query planning and execution 312 may implement query rewriter 620 to rewrite the parsed query, in some embodiments. For example, as discussed above with regard to FIG. 1, query rewriter 620 may identify useful materialized views that have been automatically created according to the techniques described above (and below). Information describing existing materialized views may be provided from materialized views 432 to query rewriter 620. For example, metadata describing the database (e.g., various tables, statistics, schemas, or other information that can be used to handle queries) may be accessed to indicate whether a materialized view is up-to-date as well as whether the materialized view can be included 622 to perform portions of the query. For example, abstract syntax trees for materialized views can be used to compare if a some or all of a received query can be answered by the data maintained in an automatically created materialized view. Automated materialized view inclusion 622 may determine how to rewrite the query to include the materialized view (e.g., modifying the target of some operations to be directed to the materialized view instead of tables).

Query rewriter 620 may also perform other rewrites to further optimize performance of the query once the changes to be incorporated along with the stale materialized view are identified. For example, query rewriter 620 may have access to metadata (e.g., table descriptions or definitions, including the names and data types of each column, physical information (e.g., partitions information), number of rows, number of distinct values, value ranges, value cardinality, value distribution, indexes, views, etc.), to rewrite portions of a query tree, such as changing the location or ordering of predicates, join operations, or other portions or operations in the query tree.

The rewritten query may then be provided to plan generator 630. Plan generator 630 may perform various operations to generate a query execution plan (e.g., a tree of plan operation nodes, which may be later used to generate query execution code). For example, plan generator may perform a cost-based optimization to select one of various combinations or orderings of plan operator nodes in a tree produces a least costly plan to execute. Plan generator 630 may also implement partition elimination, which may use metadata to filter out partitions (e.g., portions of or entire data objects) from evaluation for executing the query. For example, partition elimination may receive a list of predicates as part of query 602 and along with a list of partitions (for local and/or remote data) along with range values or other information describing the values stored within the partitions. If an evaluation of a predicate compared with the range values or other value description information were to exclude that partition from satisfying the query predicate (e.g., values in the partition are out of a range for the predicate), then operations to evaluate (e.g., scan) the partition may be removed. In scenarios where the partitions removed are partitions of remote data, in addition to saving processing costs, removal of partitions would save transmission costs (e.g., network bandwidth) to move results from remote data.

Request planning and execution 312 may implement plan execution 640. Plan execution 640 may receive the selected query plan, generate instructions to perform the query plan, and send the query execution instructions (e.g., to compute nodes of a processing cluster in FIG. 3). For example, the instructions may be generated and sent as code (or executables).

Although FIGS. 2-6 have been described and illustrated in the context of a database service, like a data warehouse service implementing a columnar relational database table, the various components illustrated and described in FIGS. 2-6 may be easily applied to other database or data storage systems that provide materialized views of database data. As such, FIGS. 2-6 are not intended to be limiting as to other embodiments of a storage engine, query engine, a single or distributed database engine or management system, processing cluster, or other component that may implement using computer resources to perform queries that reference materialized views, including resources, hosts, systems, or devices that are separate from the query engine or database management system itself (e.g., an external data replication store or system). FIG. 7 is a high-level flowchart illustrating methods and techniques to implement optimizing selection of materialized views for creation or refresh, according to some embodiments. Various different systems and devices may implement the various methods and techniques described below, either singly or working together. For example, a processing cluster, such as described above with regard to FIGS. 2-6 may implement the various methods. Alternatively, a combination of different systems and devices may implement the described techniques. Therefore, the above examples and or any other systems or devices referenced as performing the illustrated method, are not intended to be limiting as to other different components, modules, systems, or configurations of systems and devices.

As indicated at 710, materialized views may be identified for creation or refresh, in some embodiments. For example, proposed materialized views that do not yet exist, as determined according to the techniques discussed below with regard to FIG. 8, may be identified. Existing materialized views, whether created automatically by the database system (e.g., without a user specifying the creation of the materialized views) or manually created by a user submitting a request to create a materialized view may also be considered for refresh.

As indicated at 720, a subset of the materialized views may be determined for creation or refresh according to an optimization technique that selects the subset of the materialized views according to a maximized performance benefit for maintaining the subset of materialized views based on a workload of the database system caused by a set of previously received queries, according to some embodiments. For example, a benefit function for (query, MV) pair, may be implemented such that the benefit function provides a high reward if a long query (>>2 seconds) become sshort (<2 seconds). The choice of benefit function does not impact the technique, only the chosen set of MVs. Therefore, various different types of benefit functions may be implemented, in some embodiments. In some embodiments, an optimization problem to find a subset of MVs to keep fresh, out of the set of MVs created by MV creator and generator, may be used that will accrue maximum benefit on the history of queries in a time period of query history that is maintained (e.g., the query window). In some embodiments, techniques may only consider sets of MVs that can feasibly be maintained within the sum of background cycles and spendable cycles available during the time period of query history (e.g., 1 day). The technique may assume that the workload remains consistent with what it has been in the last time period of query history. For example, if a set of 5 MVs is made stale every minute and each takes 1.1 minutes to refresh, then they cannot feasibly be maintained even if there were no queries. If a set of queries take 1 minute to complete with a set of 3 MVs, and arrive every 2 minutes and these MVs take 1 minute to refresh, and are made stale every 5 minutes, they can be feasibly maintained since the total time to refresh+answer queries is less than the time available.

In some embodiments, one example of an optimization technique that may be implemented in some embodiments is a cross entropy technique. The cross entropy technique may be black-box non-linear, non-convex optimization algorithm, to find a good feasible solution to the optimization problem. The cross entropy technique may be similar to a genetic algorithm, and works as follows. Recall, the output is which set of MVs to strive to keep fresh, in a preference order. Assume that initially each MV has 50% chance of belonging to this set. Then sample 1000 MV sets according to this probability, and evaluate their cost and benefit. The top 20% of MV sets may be kept. Then update the initial 50% probabilities with the probability that the MV is in one of these 'good' sets. Then again sample 1000 MV sets from these new probabilities and iterate until the technique times out or until there is not much improvement, whichever occurs first.

The detailed optimization technique discussed above considers the benefit due to MVs that may cover each other on the MV lattice (e.g., one MV is fully contained in other) and uses the time saved by a fresh MV to refresh others. The cross entropy technique picks a reasonable set of MVs. The cross entropy technique is more valuable the more non-linear the problem is (e.g., when many MVs can be used to rewrite many queries).

The optimization technique, discussed above, does not consider the actual arrival order of queries and writes. However, in other embodiments adjustments to consider the actual arrival order of queries and writes may be considered as part of the optimization technique. In some embodiments, tightening constraints whenever MVs fail to refresh and relaxing the constrain penalty whenever MVs complete faster than expect may be used to account for estimation errors.

These optimization techniques may allow for further considerations to be made based on the available capacity to perform creation or refresh operations. For example, hypothetical scenarios if additional cycles are provided using using additional computing resources. To take into account the additional cycles, sorting of materialized views may increase the spendable cycles, thereby, relaxing the constraints on the optimization problem so that more MVs can be refreshed. This in turn helps calculate extra benefit that can be obtained due to the additional computing resources.

As indicated at 730, individual ones of the subset of materialized views may be selected to create or refresh according to a performance benefit-based order of the subset of the materialized views, according to some embodiments. For example, as part performance benefit values may be determined for each of the materialized views (e.g., as part of selecting the subset discussed above). These performance benefit values may be used to order the subset of materialized views in a task queue or other data structure which can preserve the ordering for performing the creation or refresh (depending on whether the materialized view already exists or is to be created).

As indicated at 740, the creation or refresh of the selected individual ones of the subset of the materialized views may be performed, in some embodiments. In some embodiments, capacity to create or refresh materialized views may be limited to a number of execution slots, threads, or workers. In some embodiments, these execution slots, threads, or workers may allow for parallel performance of operations to create or refresh the selected individual ones of the subset of the materialized views. In some embodiments where additional processing capacity is available, such as an additional processing cluster, instructions to send queries off to the additional processing cluster to increase the number of slots or other capacity at a current processing cluster or to send materialized view creation or refresh tasks to that additional processing cluster.

As discussed above with regard to FIG. 4, a database system may determine when additional materialized views may be beneficial for performing queries at the database system. FIG. 8 is a high-level flowchart illustrating methods and techniques to implement proposed materialized views for creation, according to some embodiments. As indicated at 810, a set of previously performed queries at a database may be collected, in some embodiments. For example, as discussed above, a time window, range, or other set boundary may be used to identify which queries that are performed are also to be collected for proposing materialized views.

As indicated at 820, a candidate set of materialized views may be generated from the set of previously performed queries, in some embodiments. For example, shorter queries may be filtered out (e.g., at the query collection stage). For each remaining query, a rewriting rule may be applied to extract the query parts that conform with supported materialized views for automatic creation. For example, in some embodiments some operations may not be supported for automatically created materialized views. The extracted query parts may be rewritten into CREATE materialized view statements in a query language (e.g., SQL) and stored for subsequent execution if selected.

As indicated at 830, those materialized views that can be merged may be identified from the candidate set, in some embodiments. For example, many similar candidate materialized views may exist. These similar candidate materialized views may be consolidated. Consider the following examples of automatically created materialized views, "amv1" and "amv2":

amv1:
    CREATE MV amv1 AS
    SELECT col1, sum(col3)
    FROM table1
    WHERE col2>12
    GROUP BY col1;
amv2:
    CREATE MV amv1 AS
    SELECT col1, sum(col3)
    FROM table1
    WHERE col2>20
    GROUP BY col1;
Merging techniques may identify them as similar and combine them into a merged materialized view, such as:
merged_amv:
    CREATE MV merged_amv: AS
    SELECT col1, col2, sum(col3)
    FROM table1
    GROUP BY col1, col2;

Some materialized view candidates may not, of course, be merged (e.g., due to a lack of similarity with other candidates). As indicated at 840, the candidate materialized views may be included for consideration for automatic creation, in some embodiments. For example, those merged materialized view candidates and those non-merged materialized view candidates may be added to a materialized view set (which may also include other automatically created materialized views that already exist) from which automatic creation may be performed as discussed in detail above with regard to FIG. 7.

As discussed above with regard to FIG. 5, the costs of maintaining materialized views that are automatically created may grow over time. Thus, techniques for removing some materialized views that are less beneficial to database performance may be implemented in order to balance the optimization that using materialized views provides with the costs for maintaining materialized views. FIG. 9 is a high-level flowchart illustrating methods and techniques to implement removing automatically created materialized views, according to some embodiments. As indicated at 910, automatically created materialized views may be monitored for removal, in various embodiments. For example, system metadata that describes the automatically created materialized views may be maintained, tracking information such as last access, last refresh, size, a performance benefit value or other information that may be used for determining whether removal should occur. As discussed earlier, in some embodiments, these queries may be maintained in a format such as an abstract syntax tree (AST), which may allow for an understanding of the various features, predicates, or other attributes of a query which can be useful for determining whether a materialized view can provide a performance benefit.

As indicated at 920, one condition for removal may be evaluated, which considers whether automatically created materialized views exceed some storage limit(s). For example, various measures of storage may be considered evaluated with respect to a storage limit, such as the number of materialized views or tables that can be maintained, a storage size or amount that can be maintained for materialized views, or a number of procedures or other artifacts used to create or refresh materialized views can be compared with a storage limit. Various combinations of these and other storage limits may be evaluated, alone or in combination, in different embodiments, to determine whether a removal condition is satisfied.

As indicated at 930, another removal condition may be whether automatically created materialized views exist that have not been refreshed within a time threshold, in some embodiments. For example, a 1 day, 48 hour, or other time threshold may be enforced and a last refresh time compared with the time threshold to determine if an automatically created materialized view exceeds the time threshold. Similarly, as indicated at 940, another removal condition may be whether automatically created materialized views exist that have not been queried within a time threshold. For example, a 1 hour, 1 week, or other time threshold may be enforced and a last queried time compared with the time threshold to determine if an automatically created materialized view exceeds the time threshold.

As indicated at 950, for those automatically created materialized views that satisfy the removal conditions, a performance benefit-based order may be used to choose which materialized view to remove. For example, a materialized view with a lower benefit value may be chosen when compared to a materialized view with a higher benefit value. In some embodiments, automatically created materialized views may continue to be chosen until a removal condition can no longer be satisfied. For example, if a materialized view is refreshed or queried, then that automatically created materialized view may not be removable. In another example, if the storage limit(s) are no longer exceeded, then no automatically created materialized view may be removable.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of implement optimizing selection of materialized views for creation or refresh as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 10:
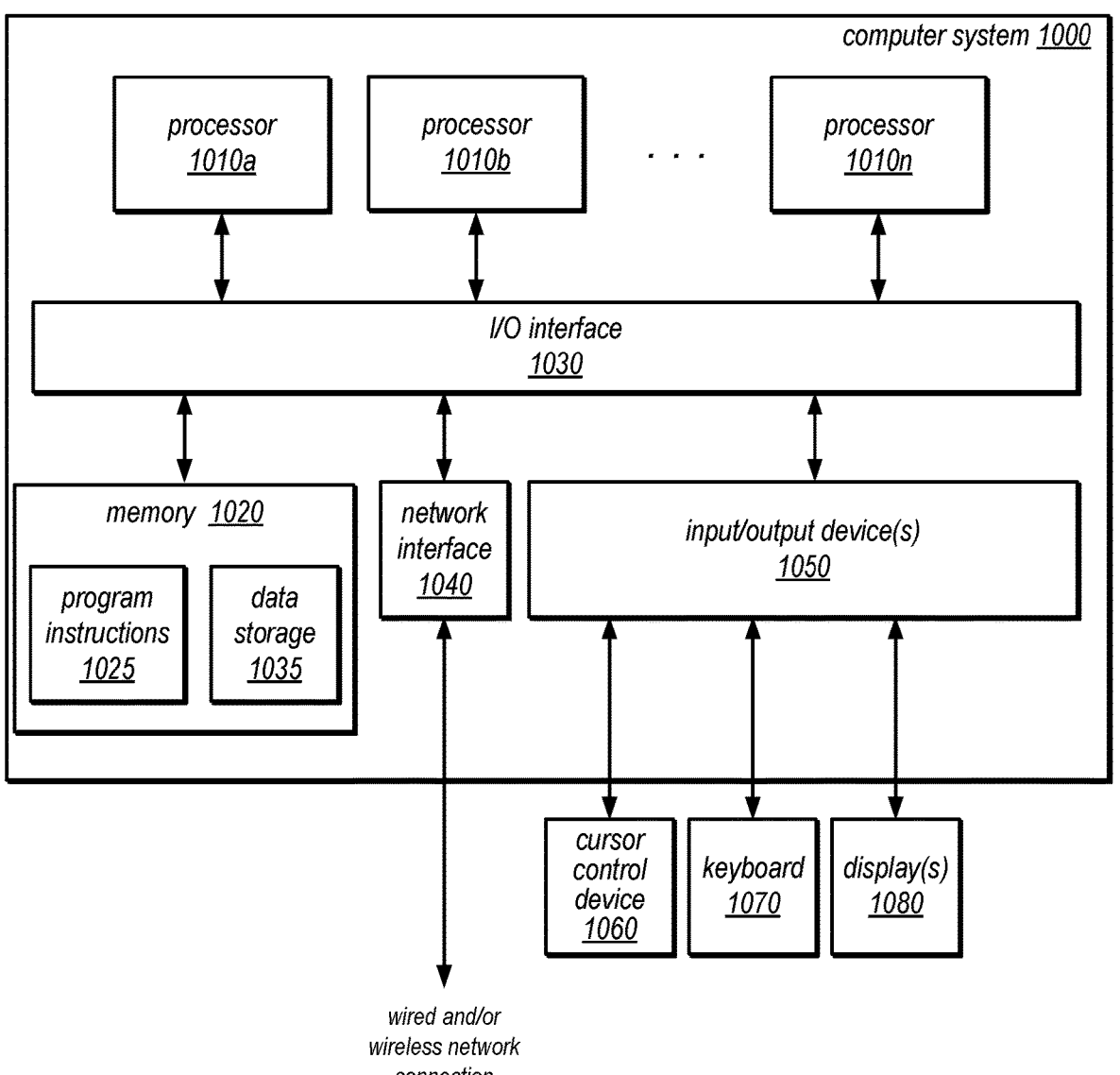
FIG. 10 illustrates an example system to implement the various methods, techniques, and systems described herein, according to some embodiments.

As shown in FIG. 10, memory 1020 may include program instructions 1025, may implement the various methods and techniques as described herein for implementing optimizing selection of materialized views for creation or refresh, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

at least one processor; and a memory, storing program instructions that when executed by the at least one processor, cause the at least one processor to implement a database system, configured to:

identify a plurality of materialized views for creation or refresh;

determine a subset of the plurality of materialized views for creation or refresh according to an optimization technique that selects the subset of the plurality of materialized views according to a maximized performance benefit for performing subsequent queries by maintaining the subset of the plurality of materialized views, wherein the maximized performance benefit for performing subsequent queries is determined based on a workload of the database system caused by a set of previously received queries that can be performed using one or more of the plurality of materialized views and a benefit function used to evaluate the set of previously received queries with respect to the plurality of materialized views, wherein at least a first materialized view of the subset of the plurality of materialized views does exist in the database system, and wherein at least a second materialized view of the subset of the plurality of materialized views does not yet exist in the database system;

queue the subset of the plurality of materialized views to create or refresh according to respective performance benefit, the queue including refresh to perform on the first materialized view of the subset of the plurality of materialized views that does exist and creation to perform on the second materialized view of the subset of the plurality materialized views that does not yet exist; and individually pull, from the queue, a number of materialized views up to a managed number of execution slots available to perform respective operations for the number of materialized views in parallel, including pulling the first materialized view of the subset of the plurality of materialized views that does exist to refresh and the second materialized view of the subset of the plurality materialized views that does not yet exist to create.

2. The system of claim 1, wherein to identify the plurality of materialized views for creation or refresh, the database system is configured to:

collect the set of previously received queries; and generate a candidate set of materialized views from the set of previously received queries.

3. The system of claim 2, wherein to identify the plurality of materialized views for creation or refresh, the database system is further configured to merge two or more of the materialized views of the candidate set of materialized views into a merged materialized view that is included in the plurality of materialized views.

4. The system of claim 1, wherein the database system is a database service implemented as part of a provider network and wherein the identification of the plurality of materialized views, the determining of the subset of the materialized views, the obtaining of individual ones of the subset of the materialized views, and the causing the creation or refresh of the obtained individual ones are performed after receiving a request via an interface of the database service to enable automatic materialized view management.

5. A method, comprising:

identifying, by a database system, a plurality of materialized views for creation or refresh;

determining, by the database system, a subset of the plurality of materialized views for creation or refresh according to an optimization technique that selects the subset of the plurality of materialized views according to a maximized performance benefit for performing subsequent queries by maintaining the subset of the plurality of materialized views, wherein the maximized performance benefit for performing subsequent queries is determined based on a workload of the database system caused by a set of previously received queries that can be performed using one or more of the plurality of materialized views and a benefit function used to evaluate the set of previously received queries with respect to the plurality of materialized views, wherein at least a first materialized view of the subset of the plurality of materialized views does exist in the database system, and wherein at least a second materialized view of the subset of the plurality of materialized views does not yet exist in the database system;

individually selecting, by the database system, a number of materialized views from the subset of the plurality of materialized views up to a managed number of execution slots available to perform respective operations for the number of materialized views in parallel according to a performance benefit-based order of the subset of the plurality of materialized views, including selecting the first materialized view of the subset of the plurality of materialized views that does exist and the second materialized view of the subset of the plurality materialized views that does not yet exist; and performing, by the database system, the of selected number of materialized views from the subset of the plurality of materialized views.

6. The method of claim 5, wherein identifying the plurality of materialized views for creation or refresh comprises:

collecting the set of previously received queries; and generating a candidate set of materialized views from the set of previously received queries.

7. The method of claim 6, wherein identifying the plurality of materialized views for creation or refresh further comprises merging two or more of the materialized views of the candidate set of materialized views into a merged materialized view that is included in the plurality of materialized views.

8. The method of claim 5, wherein selecting the individual ones of the subset of the plurality of materialized views to create or refresh according to the performance benefit-based order of the subset of the plurality of materialized views comprises increasing the number of available execution slots for refreshing or creating materialized views.

9. The method of claim 5, wherein the subset of the plurality of materialized views includes at least one existing automatically created materialized view to be refreshed and at least one materialized view to be automatically created.

10. The method of claim 5, wherein determining the subset of the plurality of materialized views for creation or refresh according to the optimization technique comprises predicting respective refresh times for one or more existing materialized views.

11. The method of claim 5, further comprising removing one or more of the plurality of materialized views that were automatically created after determining that the one or more materialized views satisfies one or more removal conditions.

12. The method of claim 11, wherein the one or more removal conditions include a time since a last refresh exceeding a time threshold.

13. The method of claim 5, further comprising:

receiving, at the database system, a query;

identifying, by the database system, one of the selected materialized views to use to perform the query; and rewriting, by the database system, the query to use the one materialized view before performing the query.

14. One or more non-transitory, computer-readable storage media, storing program instructions that when executed on or across one or more computing devices cause the one or more computing devices to implement:

identifying, by a database system, a plurality of materialized views for creation or refresh;

determining, by the database system, a subset of the plurality of materialized views for creation or refresh according to an optimization technique that selects the subset of the plurality of materialized views according to a maximized performance benefit for performing subsequent queries by maintaining the subset of the plurality of materialized views, wherein the maximized performance benefit for performing subsequent queries is determined based on a workload of the database system caused by a set of previously received queries that can be performed using one or more of the plurality of materialized views and a benefit function used to evaluate the set of previously received queries with respect to the plurality of materialized views, wherein at least a first materialized view of the subset of the plurality of materialized views does exist in the database system, and wherein at least a second materialized view of the subset of the plurality of materialized views does not yet exist in the database system;

individually obtaining, by the database system, a number of materialized views from the subset of the plurality of materialized views up to a managed number of execution slots available to perform respective operations for the number of materialized views in parallel from a task queue that orders the subset of the plurality of materialized views according to respective performance benefit, including refresh of the first materialized view of the subset of the plurality of materialized views that does exist and the second materialized view of the subset of the plurality materialized views that does not yet exist; and causing, by the database system, the performance of the respective operations of the selected number of materialized views from the subset of the plurality of materialized views.

15. The one or more non-transitory, computer-readable storage media of claim 14, wherein, in identifying the plurality of materialized views for creation or refresh, the program instructions cause the one or more computing devices to implement:

collecting the set of previously received queries; and generating a candidate set of materialized views from the set of previously received queries.

16. The one or more non-transitory, computer-readable storage media of claim 15, wherein, in identifying the plurality of materialized views for creation or refresh the program instructions further cause the one or more computing devices to implement merging two or more of the materialized views of the candidate set of materialized views into a merged materialized view that is included in the plurality of materialized views.

17. The one or more non-transitory, computer-readable storage media of claim 14, wherein the subset of the plurality of materialized views includes at least one manually created materialized view.

18. The one or more non-transitory, computer-readable storage media of claim 14, storing further instructions that when executed on or across the one or more computing devices cause the one or more computing devices to implement removing one or more of the plurality of materialized views that were automatically created after determining that the one or more materialized views satisfies one or more removal conditions.

19. The one or more non-transitory, computer-readable storage media of claim 18, wherein the one or more removal conditions include a time since a last query exceeding a time threshold.

20. The one or more non-transitory, computer-readable storage media of claim 14, wherein the database system is a database service implemented as part of a provider network and wherein the identification of the plurality of materialized views, the determining of the subset of the materialized views, the obtaining of individual ones of the subset of the materialized views, and the causing the creation or refresh of the obtained individual ones are performed after receiving a request via an interface of the database service to enable automatic materialized view management.

\* \* \* \* \*